United States Patent
Zhang et al.

(10) Patent No.: US 8,938,451 B2
(45) Date of Patent: *Jan. 20, 2015

(54) METHOD, APPARATUS AND SYSTEM FOR LINKING DOCUMENTS

(75) Inventors: Li Zhang, Beijing (CN); Li Ping Yang, Beijing (CN); Shixia Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1746 days.

This patent is subject to a terminal disclaimer.

(21) Appl. No.: 12/133,766

(22) Filed: Jun. 5, 2008

(65) Prior Publication Data

US 2008/0288535 A1    Nov. 20, 2008

Related U.S. Application Data

(63) Continuation of application No. 11/439,055, filed on May 23, 2006, now Pat. No. 7,499,934.

(51) Int. Cl.
*G06F 17/30* (2006.01)
(52) U.S. Cl.
CPC .... *G06F 17/30864* (2013.01); *G06F 17/30728* (2013.01)
USPC .......................................................... 707/726
(58) Field of Classification Search
CPC ........................ G06F 17/30864; G06F 17/3069
See application file for complete search history.

(56) References Cited

U.S. PATENT DOCUMENTS

| | | | |
|---|---|---|---|
| 6,078,913 A | 6/2000 | Aoki et al. | |
| 6,078,924 A | 6/2000 | Ainsbury et al. | |
| 6,101,552 A | 8/2000 | Chiang et al. | |
| 6,112,202 A | 8/2000 | Kleinberg | |
| 6,137,911 A | 10/2000 | Zhilyaev | |
| 6,285,999 B1 | 9/2001 | Page | |
| 6,598,054 B2 * | 7/2003 | Schuetze et al. ...................... 1/1 |
| 6,609,124 B2 | 8/2003 | Chow et al. | |
| 6,766,371 B1 | 7/2004 | Hipp et al. | |
| 6,775,677 B1 * | 8/2004 | Ando et al. ................... 707/739 |
| 6,778,995 B1 | 8/2004 | Gallivan | |

(Continued)

FOREIGN PATENT DOCUMENTS

CN     1539112 A     10/2004
WO   2004031916 A2    4/2004

OTHER PUBLICATIONS

J.M. Kleinberg, "Authoritative Sources in a Hyperlinked Environment," In Proc. of the ACM-SIAM Symp. on Discrete Algorithms, ACM Press, 1998, 34 pages, New York.

(Continued)

*Primary Examiner* — Yuk Ting Choi
(74) *Attorney, Agent, or Firm* — Ryan, Mason & Lewis, LLP (57) ABSTRACT

A method, apparatus and system for linking documents, the method comprising the steps of: providing a plurality of clusters in an enterprise intranet, each cluster consists of one or more documents; building a cluster page for each cluster to present the documents in the cluster; and building links between the cluster pages, between the documents, and between the cluster page and the document, based on analysis of the contents of the clusters and the documents. The present invention is useful for building the links between separate documents and may apply a link analyzing algorithm to the search for these documents to implement better search performance within the enterprise intranet.

15 Claims, 5 Drawing Sheets

(56) References Cited

U.S. PATENT DOCUMENTS

| | | | |
|---|---|---|---|
| 7,213,205 B1 * | 5/2007 | Miwa et al ................... | 715/234 |
| 7,231,393 B1 * | 6/2007 | Harik et al. ........................... | 1/1 |
| 2002/0040370 A1 | 4/2002 | Entwistle | |
| 2002/0078035 A1 | 6/2002 | Frank et al. | |
| 2002/0138628 A1 | 9/2002 | Tingley et al. | |
| 2002/0156779 A1 | 10/2002 | Elliott et al. | |
| 2002/0156817 A1 | 10/2002 | Lemus | |
| 2004/0044659 A1 | 3/2004 | Judd et al. | |
| 2004/0122786 A1 | 6/2004 | Uceda-Sosa | |
| 2004/0139042 A1 | 7/2004 | Schirmer et al. | |
| 2004/0162914 A1 | 8/2004 | St. Pierre et al. | |
| 2004/0181554 A1 | 9/2004 | Heckerman et al. | |
| 2004/0186826 A1 | 9/2004 | Choi et al. | |
| 2004/0187075 A1 | 9/2004 | Maxham et al. | |

OTHER PUBLICATIONS

A. Mehler et al., "Towards Logical Hypertext Structure—A Graph-Theoretic Perspective," Proc. of I2CS'04, Lecture Notes in Computer Science, Berlin-New 2004, 15 pages, Guadalajara/Mexico.

G. Buchanan et al., "Integrating Information Seeking and Structuring: Exploring the Role of Spatial Hypertext in a Digital Library," in Proceedings of HT '04, 2004, pp. 225-234.

* cited by examiner

METHOD, APPARATUS AND SYSTEM FOR LINKING DOCUMENTS

CROSS-REFERENCE TO RELATED APPLICATION(S)

This application is a continuation of U.S. application Ser. No. 11/439,055 filed on May 23, 2006, and now issued as U.S. Pat. No. 7,499,934, the disclosure of which is incorporated herein by reference.

TECHNICAL FIELD

The present invention relates to a method, apparatus and system for linking documents, particularly to a clustering-based method, apparatus and system for linking enterprise documents into a WWW-like virtual network inside an enterprise intranet.

BACKGROUND ART

Searching is the most popular way to get useful information from the web and enterprise networks. For web page search, a most famous and effective algorithm is Google's PageRank method, which is to calculate the web page's importance via hyperlinks among the huge set of web pages on the web. The main principle of Page rank algorithm is that, if a page is pointed by many pages, then it indicates this page is a good page; on the other hand, if an important refers to another page, then the other page is also important. The PageRank method has been used in Googles search engine, which has been proved to be the best search engine at present. The PageRank method was invented by Google's founders Larry Page and Sergey Brin while at Stanford University in 1998, and has been patented as U.S. Pat. No. 6,285,999.

An alternative to the PageRank algorithm is the HITS algorithm proposed by Jon Kleinberg. The HITS proposes two types of web pages. One is a hub page containing a lot of web pages linked by the same subject, and the other is an authority page whose content corresponds to a related subject. The HITS algorithm presumes that a good hub page points to many good authority pages, and a good authority page is a web page pointed to by many other web pages. Hub pages and authority pages exhibit a mutually reinforcing relationship, i.e. a better hub page points to many good authority pages, and a better authority page is pointed to by many good hub pages.

A critical factor for applying these above algorithms is the hyperlinks between web pages. But as to enterprise internal search, there exists a big problem. As we all know, unlike web-based documents, a plurality of documents such as enterprise internal documents are not usually interlinked, thus a search engine technology based on link analysis is not applicable. This is one of the reasons of the inefficiency in enterprise internal document search.

Therefore, there is a need for a method and system for conducting a document search high efficiently, particularly a method and system for an enterprise internal document search.

SUMMARY OF THE INVENTION

An object of the present invention is to provide a method and system for conducting a document search high efficiently, which is particularly suitable for an enterprise internal document search. The method and system of the present invention automatically builds inter-document links into WWW-like virtual network, so that the link analysis method for web pages can also be effectively applied in enterprise internal document search.

The present invention proposes a clustering-based method and system for linking enterprise documents into a WWW-like virtual network. Similar to hub and authority pages on the web, by using many different methods, a plurality of documents are split into clusters, which is constructed into cluster pages like the hub pages. Each cluster page is represented by a list of documents in the corresponding cluster, and each document is considered as an authority page. Then, the linkage among the cluster pages and the documents can be established automatically based on the analysis of the contents of the cluster pages and the documents. In this way, the original standalone documents are linked together to form a virtual network as the World Wide Web.

Based on the above concept, the present invention provides a method for linking documents, comprising the steps of: forming a plurality of clusters each consisting of one or more documents; building a cluster page for each cluster to represent the documents in the cluster; and building links based on analysis of the contents of the clusters and the documents.

The present invention also provides an apparatus for linking documents, comprising: a storing means for storing a plurality of clusters each consisting of one or more documents; a processing means for building a cluster page for each cluster to represent the documents in the cluster; and a link building means for building links based on analysis of the contents of the clusters and the documents.

The present invention provides a system for linking documents, comprising a first device and a second device, wherein the first device comprises: a storing means for storing a database in which a plurality of clusters each consisting of one or more documents are stored; a processing means for building a cluster page for each cluster to represent the documents in the cluster; and a link building means for building links between the cluster pages, between the documents, and between the cluster page and the document, based on analysis of the contents of the clusters and the documents, and wherein the second device comprises a search engine for searching the database for a required document based on the built links.

The present invention can realize the following advantages of: helping to automatically build inter-links among separate documents; and capable of applying link analysis algorithms into search for these documents to achieve better search performance.

BRIEF INTRODUCTION TO THE DRAWINGS

The above and other features and advantages of the present invention will become more apparent from the detailed description of the preferred embodiment of the present invention in conjunction with drawings, in which.

DETAILED DESCRIPTION THE INVENTION

First, definitions for some terms used in the present invention will be given below.

Cluster: Cluster is a set of documents. In the present invention, a cluster can be a folder in the file system or a category in taxonomy, which can be built by any traditional clustering method. One document can belong to one or more clusters.

Cluster page: It is a virtual web page. It consists of the list of documents in the cluster.

Link: It is a directed anchor among cluster pages and the original documents. In the present invention, a link can point from a cluster page to another cluster page, or from a cluster page to a document, or from a document to a cluster page, or from a document to another document.

A preferred embodiment of the present invention will be described specifically below in conjunction with the drawings.

Figure 1:
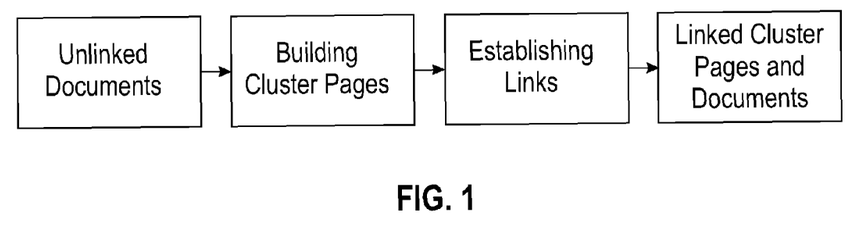
FIG. 1 is a schematic diagram of the concept of the present invention, showing the whole process for building links according to the present invention.

FIG. 1 is a schematic diagram of the concept of the present invention, showing the whole process for building links according to the present invention. As shown in FIG. 1, firstly, a plurality of unlinked documents are split into several clusters; for each cluster, a cluster page is built, and there is a document list on the cluster page, so as to represent all documents in the cluster. Secondly, links are constructed automatically based on the content analysis of the clusters and documents therein (which will be described in detail later).

In the present invention, the plurality of clusters which contain one or more documents can be provided directly without the process for splitting documents. The process for splitting documents can be additionally conducted independent of the present invention.

Figure 2:
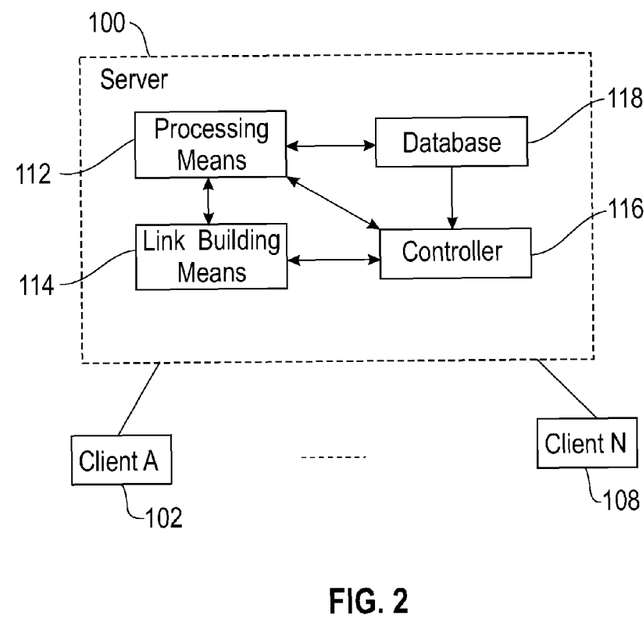
FIG. 2 is an example of a block diagram of a system according to an embodiment of the present invention.

FIG. 2 is an example showing a block diagram of an enterprise internal network system which applies the present invention. As shown in FIG. 2, there are shown a server 100 and client A 102 to client N 108 connected to the server 100 via an enterprise internal network (for clarity, only two clients are shown, but it can be any number capable of being accommodated by the network).

The server 100 comprises: a controller 116 for controlling the operations of the server 100 and the constituting components therein; a processing device 112 for splitting a plurality of unlinked documents into a plurality of different clusters, and establishing the cluster page for each cluster to indicate documents in the cluster; a link building device 114 for building links from a cluster page to another cluster page, or from a cluster page to a document, or from a document to a cluster page or from a document to another document; and a database 118 for storing various documents and data (including the unlinked documents, the linked documents, and the built links, etc.).

The above processing device 112 may also comprise a single cluster forming means (not shown) for forming a plurality of clusters, where each cluster consists of one or more documents.

After building corresponding links for the documents and cluster pages, a user can search the database 118 for a required document by a search engine running on client A or client N and etc., under the control of the controller 116 and etc. in the server 100.

Of course, in the present invention, proper links can be built for the cluster pages and the documents therein if the cluster pages have been provided in advance in the database 118 by directly using the link building device 114 without the processing device 112.

As a computer or other computing device, the server 100, as well as client A and client N each has such necessary basic elements as a CPU, an ROM, an RAM and etc., an input device such as a keyboard, a mouse and etc., and an output device such as a display, a speaker and etc. For simplicity, no detailed description will be given here.

In addition, the enterprise intranet system of the present invention is not limited to the above examples (i.e. the server-client mode), and it can be any form such as a client-client peer connection and etc., as long as it can implement the method of the present invention, where the database being searched can locate at any device including a client.

Figure 3:
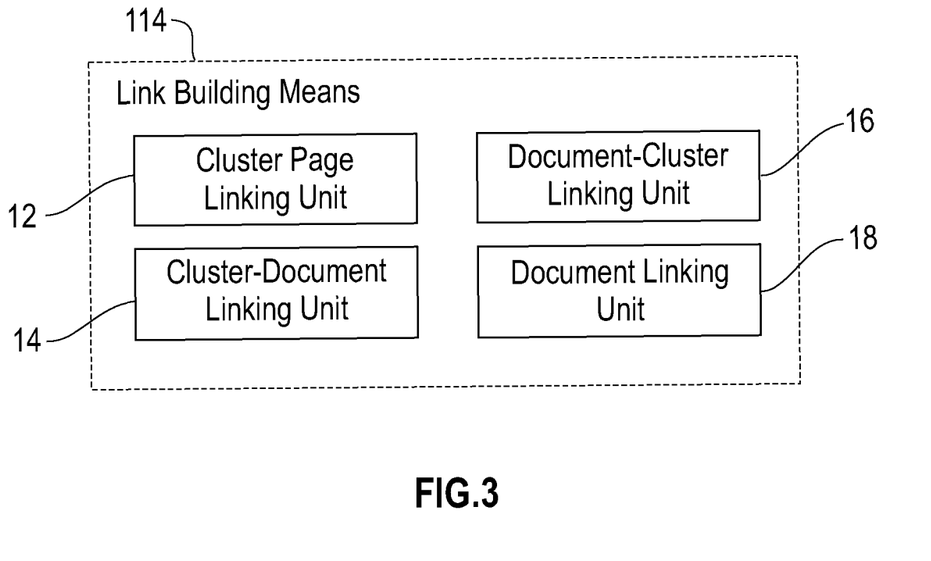
FIG. 3 is a constitutional block diagram of a link building device according to an embodiment of the present invention.

FIG. 3 is a functional block diagram of the constitution of the link building device 114 according to the present invention.

As shown in FIG. 3, the link building device 114 comprises four components for building links, which are: a cluster page linking component 12 for building links between cluster pages; a cluster-document linking component 14 for building a link from a cluster page to a document; a document-cluster linking component 18 for building a link from a document to a cluster page; and a document linking component 16 for building links between documents.

In the present invention, under the control of a controller, through the processing of such four components as 12, 14, 16 and 18, links can be generated automatically for the unlinked enterprise documents and cluster pages. Once the links are established between the enterprise documents and cluster pages, various link analysis algorithms (known by those skilled in the art) can be applied into search engines to improve the search performance of enterprise documents.

Some example methods for splitting a plurality of documents into clusters according to the present invention will be described below: (1) In the file system, a folder can be treated as a cluster, and documents under a folder belong to the corresponding cluster; (2) The a category in the taxonomy can be treated as a cluster, and documents in the category also fall into the corresponding cluster; (3) Selecting one clustering algorithm and splitting a document set into m clusters, where m can be varied many times; (4) Fixing the number of clusters, and applying n different clustering algorithms on the document set to form the clusters; and (5) Using any combination of the above methods. The processing apparatus of the present invention (or a cluster forming apparatus) can be configured to form a cluster by using the above one or more methods, for example, to combine the clusters formed through different methods, or to form a cluster by using one method and to correct it by using another method.

Grouping a plurality of documents into many kinds of clusters by using various methods is consistent with the fact that document organization is actually from different viewpoints, which simulates the diversity characteristics of web pages. The method for clustering in the prior art is well known by those skilled in the art, which will not be described in detail here.

In addition, as mentioned above, the present invention may also not include the method for splitting a plurality of documents into several clusters, but documents split into clusters are provided in advance in a server (which can be a client in other environments) or its database, thereby links are directly built for clusters and documents therein.

The example methods for building various links will be described in detail below.

Given that M documents are grouped into N clusters by using the above mentioned various methods, the documents are represented as $D=\{d_1, \ldots, d_M\}$, and the cluster pages are represented as $C=\{c_1, \ldots, c_N\}$, where M and N can be any natural number.

(i) Building Links Between Cluster Pages

Figure 4:
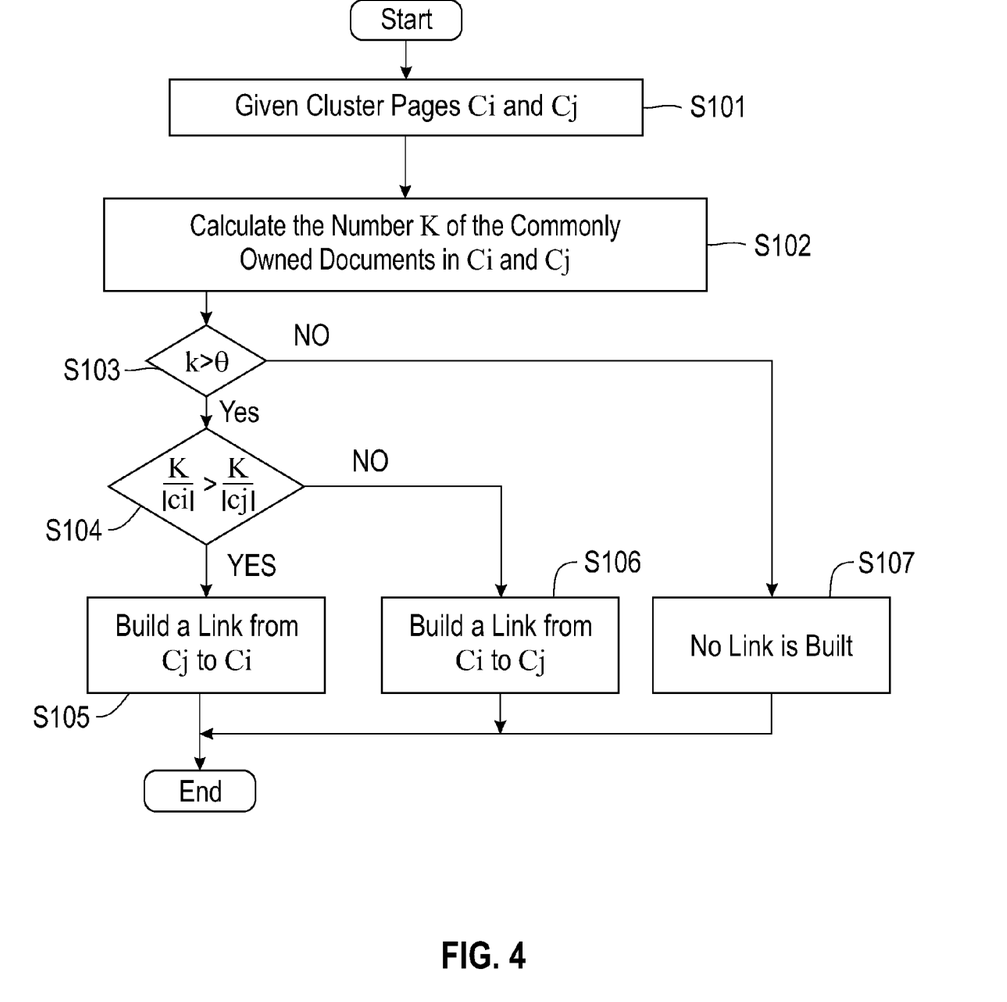
FIG. 4 is a flowchart of a method for building links between cluster pages according to an embodiment of the present invention.

A method for building links between the cluster pages according to the present invention, i.e. the operation performed by the cluster page linking component 12, will be described with reference to the flowchart of FIG. 4. The main idea of this method is to build links between two cluster pages that have enough number of common documents, such as the links between the hub pages in the web.

At step S101, suppose there are two cluster pages $c_i$ and $c_j$ (where i and j=1, . . . , N). The cluster page $c_i$ contains m documents $\{d_{i,1}, \ldots, d_{i,m}\}$, and the cluster page $c_j$ contains n documents $\{d_{j,1}, \ldots, d_{j,n}\}$. Next, at step S102, for each pair of cluster pages $c_i$ and $c_j$, compute $c_i \cap c_j = \{d | d \in c_i, \text{ and } d \in C_j, d \in D\}$, where $c_i \cap c_j$ is a document set not only belonging to the cluster page $c_i$, but also belonging to cluster page $c_j$. The document number in this set is $|c_i \cap c_j|=k$ where $0 \le k \le$ the smaller one of m and n.

At step S103, given a threshold $\theta$, and determine whether k is greater than or equal to $\theta$. If $k \ge \theta$, then perform steps S104 to S106, i.e. generate a link between such two cluster pages $c_i$ and $c_j$. Otherwise, if $k<\theta$, then perform step S107, i.e. do not generate a link between cluster pages $c_i$ and $c_j$.

That is to say, if the number of the commonly owned documents in $c_i$ and $c_j$ exceeds a threshold $\theta$, then a link between the cluster pages $c_i$ and $c_j$ is built.

Next at step S104, determine whether the following is true:

$$\frac{|c_i \cap c_j|}{|c_i|} \ge \frac{|c_i \cap c_j|}{|c_j|},$$

that is to say, determine whether or not the proportion of the number k of the commonly owned documents to the cluster $c_i$ is greater than the proportion of it to the cluster $c_j$. If the determination result is "yes", then proceed to step S105, i.e. generate a link from the cluster page $c_j$ to the cluster page $c_i$. Otherwise, if the determination result is "no", proceed to step S106 to generate a link from the cluster page $c_i$ to the cluster page $c_j$.

Thus, by applying the above algorithm repeatedly, links between the cluster pages are built.

(ii) Building a Link from a Cluster Page to a Document Page

The link from a cluster page to a document page is a link from every item in the cluster page to a proper content of the document. This type of link simulates the link from the hub pages to the authority pages in the web.

The specific method is as follows. Given a cluster page $c_i$, which contains m documents $\{d_{i,1}, \ldots, d_{i,m}\}$. For each document $d_{i,j} \in c_i$ (where j=1, . . . , m), in the present invention, a link from the cluster page $c_i$ to the document $d_{i,j}$ can be directly generated through the operation performed by the cluster-document linking component 14. That is to say, at all events, a link from the cluster page $c_i$ to each document $d_{i,j}$ therein exists.

Thus, by applying the above algorithm to each cluster page and each document therein, a link from a cluster page to a document is built.

(iii) Building a Link from a Document to a Cluster Page

Figure 5:
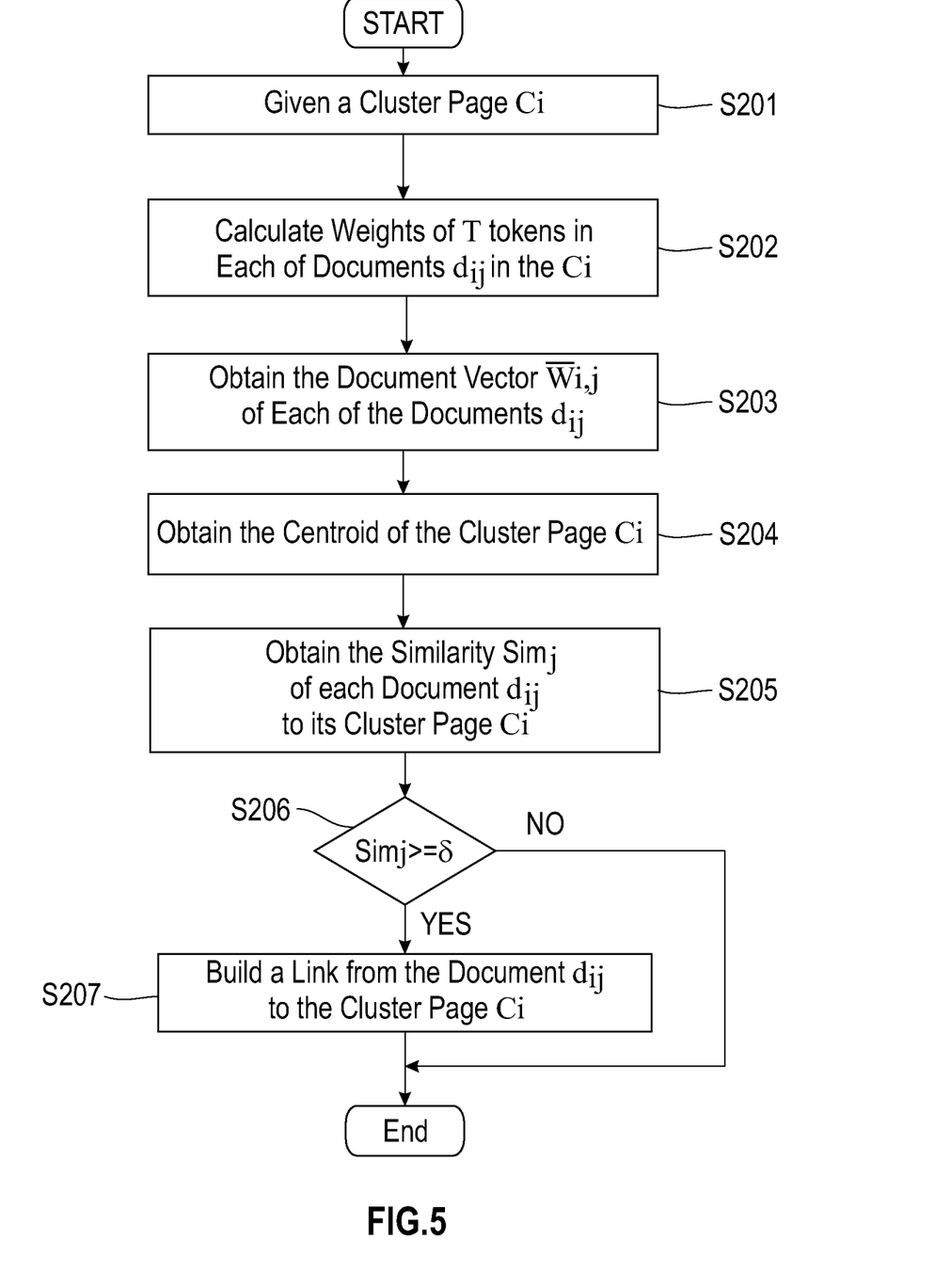
FIG. 5 is a flowchart of a method for building a link from a document to a cluster page according to an embodiment of the present invention.

A method for building a link from a document to a cluster page according to the present invention, i.e. the operation performed by the document-cluster linking component 16, will be described in connection with FIG. 5. For each document, the link from the document to its cluster page exists only if it is a representative document in the cluster, i.e., the document is close to the centroid of the cluster with some similarity policy. This type of link is similar to the phenomenon on the web that an authority page has several links to different hub pages.

At step S201, given a cluster page $c_i$, which contains m documents $\{d_{i,1}, \ldots, d_{i,m}\}$, suppose the centroid vector of the cluster is $\overline{W}_{cent}=\{w_1, \ldots, w_T\}$. Initialize each weight therein to 0, i.e. $w_t=0.0$ (where t=1, . . . , T), where $w_t \in \overline{W}_{cent}$ and T is the number of tokens in a set of documents.

For each document $d_{i,j} \in c_i$ (where j=1, . . . , m), segment the document into tokens, and suppose the document vector of the document $d_{i,j}$ is:

$$\overline{W}_{i,j}=\{w_{j,1}, \ldots, w_{j,T}\} \quad (1)$$

where, $w_{j,t}$ is the weight of the t'th token, where t=1, . . . , T. That is to say, the document vector of the document $d_{i,j}$ is a vector composed of the weights of tokens in the document.

At step S202, compute the weight of the t'th token as:

$$w_{j,t}=tf_{j,t}*idf(t) \quad (2)$$

where, $tf_{j,t}$ indicates the emerging frequency of the t'th token in the j'th document $d_{i,j}$ of the cluster $c_i$, i.e. a word frequency; while $$idf(t) = \log\frac{N}{N_t},$$

where N indicates the number of documents in a document set, $N_t$ indicates the number of documents containing token t in a document set, idf(t) is referred to as an inverse document frequency, which decreases along with the increase of $N_t$. By repeating the above equation, weights of all tokens in the document $d_{i,j}$ can be computed. The above equation for computing the token weight is well known to those skilled in the art, and will not be described in detail here.

At step S203, substitute equation (2) into equation (1) so as to obtain the value of the document vector $\overline{W}_{i,j}$ of the document $d_{i,j}$.

At step S204, by averaging arithmetically m document vectors $\overline{W}_{i,j}$, compute the centroid of the cluster as:

$$\overline{W}_{cent} = \frac{1}{m}\sum_{j=1}^{m} \overline{W}_{i,j} \quad (3)$$

At step S205, for each document $d_{i,j} \in c_i$, compute the similarity of the document vector to the vector of the centroid of its cluster as:

$$\text{Sim}(d_{i,j},c_i)=\cos(\overline{W}_{i,j},\overline{W}_{cent}) \quad (4)$$

At step S206, determine whether $\text{Sim}(d_{i,j},c_i) \ge \sigma$ is true, where $\sigma$ is the threshold of the similarity of the document vector to the vector of the centroid of its cluster. If the determination result at step S206 is "yes", proceed to step S207, where a link from the document $d_{i,j}$ to the cluster page $c_i$ is generated.

Thus, by applying the above described method repeatedly to the document $d_{i,j}$ and the cluster page $c_i$, the links are built from documents to the cluster pages they belongs to.

It should be explained that the function $\cos(\overline{W}_{i,j}, \overline{W}_{cent})$ in the equation (4) is well known to those skilled in the art, and need not be described in further detail here.

(iv) Building Links between Documents

A method for building links between documents according to the present invention, i.e. the operation performed by the document linking component 18, will be described below in conjunction with FIG. 6. If one document cites another document, with some topic terms or keywords, then a link is built from the document to the cited one. For example, if an author's name and a book's name are mentioned in one document, then it can refer to the introduction document of the author's book. On the other hand, if two documents are similar in the content, then a link from one document to the other can be built. This type of link reflects the links between authority pages on the web.

The method for building such a link according to the present invention will be described below.

Figure 6:
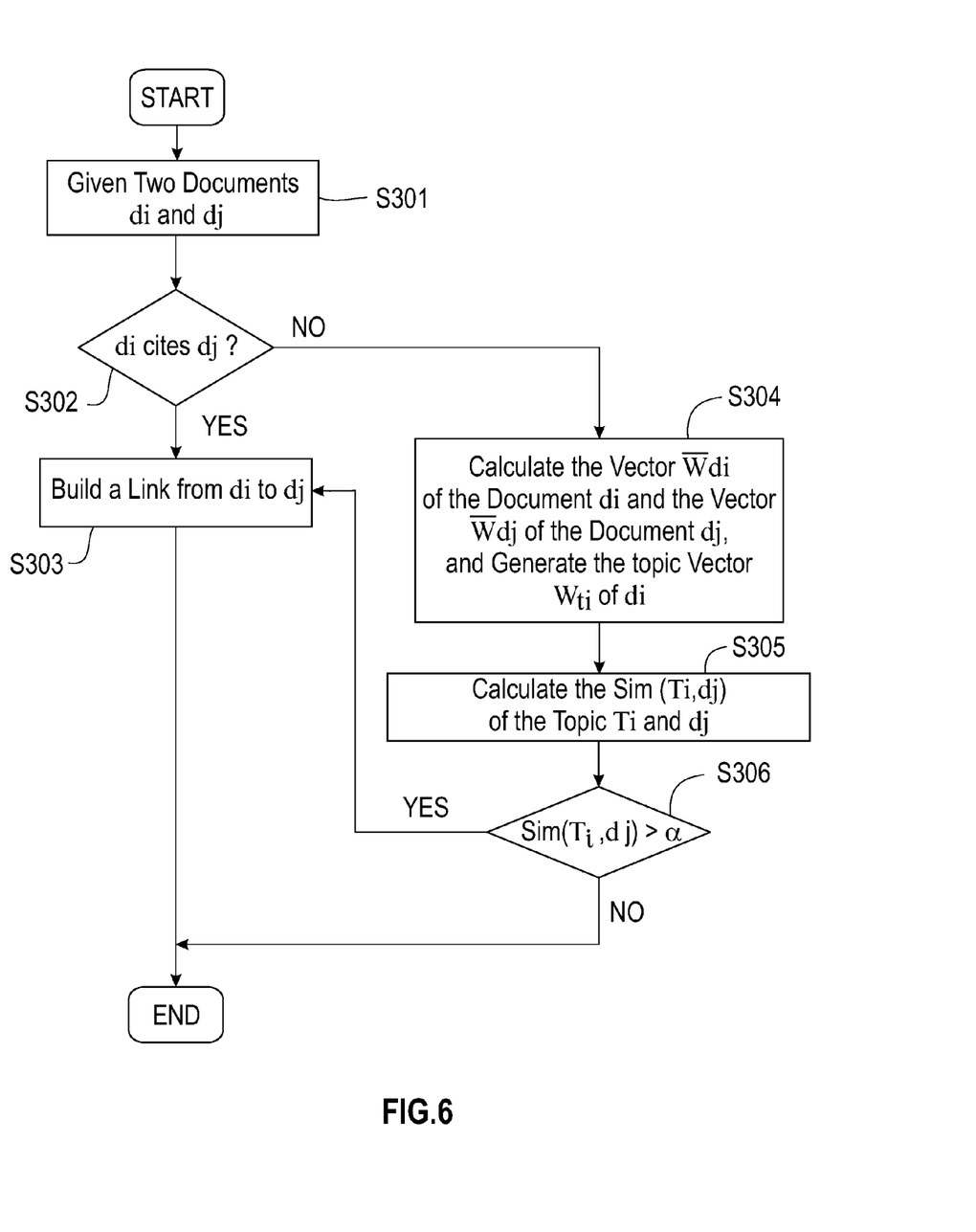
FIG. 6 is a flowchart of a method for building links between documents according to an embodiment of the present invention.

FIG. 6 is a flowchart illustrating the method for building links between documents according to the present invention.

As shown in FIG. 6, at step S301, a plurality of documents $D=\{d_1, \ldots, d_M\}$ are given, where there are two arbitrary documents $d_i$ and $d_j$ (where $i, j=1, \ldots, M$).

At step S302, determine whether there exists a citation in the document $d_i$ to the document $d_j$.

If the determination result at step S302 is "yes", then proceed to step S303, where a link from the document $d_i$ to the document $d_j$ is generated. Otherwise, if there exists in the document $d_i$ no citation to the document $d_j$, i.e. the determination result at step S302 is "No", proceed to step S304.

At step S304, compute the vector $\overline{W}_{di}$ of the document $d_i$ and the vector $\overline{W}_{dj}$ of the document $d_j$ by using the method described at steps S202 and S203, respectively. Moreover, arrange each keyword in document $d_i$ in an order from great to small in weight, set the number of the topic terms to $\iota$, and select the first $\iota$ keywords as the topic terms to form a topic $T_i$ with the corresponding vector of the topic being $\overline{W}_{T_i}$. In the topic vector $\overline{W}_{T_i}$, the weight of each topic term is equal to its weight in the document vector $\overline{W}_{di}$, and the weights of other keywords are 0.

At step S305, compute a similarity $\text{Sim}(T_i, d_j)$ of the topic $T_i$ and the document $d_j$ by using the following equation (5).

$$\text{Sim}(T_i, d_j) = \cos(\overline{W}_{T_i}, \overline{W}_{dj}) \qquad (5)$$

at step S306, determine whether $\text{Sim}(T_i, d_j) \geq \alpha$ is true, where $\alpha$ is the threshold of the similarity of the topic $T_i$ and the document $d_j$.

If $\text{Sim}(T_i, d_j) \geq \alpha$ is true, i.e. the determination result at step S306 is "yes", return to step S303. That is to say, a link from the document $d_i$ to the document $d_j$ is built at step S303. Namely, if the similarity of the topic in the document $d_i$ and that in the document $d_j$ is greater than a certain threshold, a link is built from the document $d_i$ to the document $d_j$.

If the determination result at step S306 is "No", or after completing step S303, the process ends.

Thus, a link between documents $d_i$ and $d_j$ is built by using the above method.

The distinctive features of the above method are that, for two documents, since their topic vectors are not completely uniform, the similarity values obtained based on the above method are not symmetrical, thereby capable of avoiding to build an unnecessary bi-directional (symmetrical) link between the two documents.

In the present invention, the above method can be implemented not only by running a software in a computing device such as a computer and etc., but also by integrating a corresponding software into a hardware unit such as CPU, DSP and etc., and constructing the apparatus and system of the present invention with the formed hardware unit.

It can be easily understood by those skilled in the art that the present invention is applicable not only for a server and a computer, but also for other types of computing devices. Moreover, the present invention is also applicable for various network and non-network environment applications, such as a document database application in a computing device and etc.

Since links are built between documents and cluster pages in an enterprise intranet by using the above method of the present invention, various link analyzing algorithms can be applied to a search engine within an enterprise, improving the performance of the search for enterprise documents.

While the present invention is described in connection with specific embodiments, it can be known by those skilled in the art that various modifications and changes can be made to the embodiments of the present invention without departing from the spirit and scope of the present invention.

What is claimed is:

1. A method for linking documents, comprising a computer performing the steps of:
   obtaining a set of documents, wherein documents in the set of documents are not interlinked with other documents via one or more hyperlinks;
   forming a plurality of clusters from the set of documents, each cluster comprising one or more documents;
   building a cluster page for each cluster to represent the documents in the cluster; and
   building links based on analysis of the contents of the clusters and the documents;
   wherein, when a similarity of a topic of a first document of the set of documents to a second document of the set of documents is greater than a threshold, a link is built from the first document to the second document, the similarity being a cosine function of an angle between a topic vector of the first document and a document vector of the second document;
   wherein said step of building links comprises one or more of the following steps:
   building the link between the cluster pages;
   building the link from the cluster page to the document;
   building a link from the document to the cluster page; and
   building the link between the documents;
   wherein, when the number of documents commonly owned by a first cluster and a second cluster is greater than or equal to a threshold, build the links between the cluster page of the first cluster and the cluster page of the second cluster; and
   wherein, when the proportion of the number of commonly owned documents in the first cluster is greater than that in the second cluster, generate a link from the cluster page of the second cluster to the cluster page of the first cluster, otherwise generate a link from the cluster page of the first cluster to the cluster page of the second cluster.

2. The method according to claim 1, wherein a link is built from a cluster page to each document therein.

3. The method according to claim 1, wherein the plurality of clusters are provided by splitting a plurality of unlinked documents into different sets within an enterprise intranet.

4. The method according to claim 1, wherein the step of forming the plurality of clusters comprises one or more of the following steps:

taking a folder in a document system as a cluster, the documents under a folder belonging to the corresponding cluster;

taking a category in taxonomy as a cluster, the documents in the category belonging to the corresponding cluster;

selecting a clustering algorithm, and splitting a document set into m clusters, where m can be varied many times; and fixing the number of cluster, and applying n different clustering algorithms to the document set to from the cluster.

5. A method for linking documents, comprising a computer performing the steps of:

obtaining a set of documents, wherein documents in the set of documents are not interlinked with other documents via one or more hyperlinks;

forming a plurality of clusters from the set of documents, each cluster comprising one or more documents;

building a cluster page for each cluster to represent the documents in the cluster; and building links based on analysis of the contents of the clusters and the documents;

wherein, when a similarity of a topic of a first document of the set of documents to a second document of the set of documents is greater than a threshold, a link is built from the first document to the second document, the similarity being a cosine function of an angle between a topic vector of the first document and the document vector of the second document;

wherein said step of building links comprises one or more of the following steps:

building the link between the cluster pages;

building the link from the cluster page to the document;

building the link from the document to the cluster page; and building the link between the documents;

wherein, when the similarity of a document and its cluster is greater than a threshold, generate a link from the document to the cluster page of the cluster, the similarity is a cosine function of the angle between the document vector of the document and the centroid vector of the cluster, and the centroid vector is the arithmetic average value of the document vector.

6. The method according to claim 5, wherein the document vector is a vector composed of the weights of a plurality of tokens in the document, and the weight of the token is a function of the frequency of the token in the document and the number of documents containing the token in a document set.

7. The method according to claim 5, wherein, when the number of documents commonly owned by a first cluster and a second cluster is greater than or equal to a threshold, build the links between the cluster page of the first cluster and the cluster page of the second cluster.

8. An apparatus for linking documents, comprising:

means for obtaining a set of documents, wherein documents in the set of documents are not interlinked with other documents via one or more hyperlinks;

means for storing a plurality of clusters from the set of documents, each cluster comprising one or more documents;

means for building a cluster page for each cluster to represent the documents in the cluster; and means for building links based on analysis of the contents of the clusters and the documents;

wherein, when a similarity of a topic of a first document of the set of documents to a second document of the set of documents is greater than a threshold, a link is built from the first document to the second document, the similarity being a cosine function of an angle between a topic vector of the first document and the document vector of the second document;

wherein the link building means comprises one or more of the following units:

a cluster page linking unit that builds the link between the cluster pages;

a cluster-document linking unit that builds the link from the cluster page to the document;

a document-cluster linking unit that builds the link from the document to the cluster page; and a document linking unit that builds the link between the documents;

wherein, when the number of documents commonly owned by a first cluster and a second cluster is greater than or equal to a threshold, the link building means builds the links between the cluster page of the first cluster and the cluster page of the second cluster; and wherein, when the proportion of the number of commonly owned documents in the first cluster is greater than that in the second cluster, the link building means generates a link from the cluster page of the second cluster to the cluster page of the first cluster, otherwise the link building means generates a link from the cluster page of the first cluster to the cluster page of the second cluster.

9. The apparatus according to claim 8, wherein the processing means comprises a cluster forming means that forms the plurality of clusters each consisting of one or more documents.

10. The apparatus according to claim 8, wherein the cluster forming means is further configured to form the clusters by using one or more of the following processes:

taking a folder in a document system as a cluster, the documents under a folder belonging to the corresponding cluster;

taking a category in taxonomy as a cluster, the documents in the category belonging to the corresponding cluster;

selecting a clustering algorithm, and splitting a document set into m clusters, where m can be varied many times; and fixing the number of the clusters, and applying n different clustering algorithms to the document set to foam the cluster.

11. The apparatus according to claim 8, wherein, when the similarity of a document and its cluster is greater than a threshold, the link building means generates a link form the document to the cluster page of the cluster, the similarity is a cosine function of the angle between the document vector of the document and the centroid vector of the cluster, and the centroid vector is the arithmetic average value of the document vector.

12. The apparatus according to claim 8, wherein a link is built from a cluster page to each document therein.

13. A system for linking documents, comprising:

a first device, wherein the first device comprises:

an obtaining means for obtaining a set of documents, wherein documents in the set of documents are not interlinked with other documents via one or more hyperlinks;

a storing means for storing a database in which a plurality of clusters from the set of documents, each cluster comprising one or more documents, are stored;

a processing means for building a cluster page for each cluster to represent the documents in the cluster; and a link building means for building links between the cluster pages, between the documents, and between the cluster page and the document, based on analysis of the contents of the clusters and the documents, wherein, when a similarity of a topic of a first document of the set of documents to a second document of the set of documents is greater than a threshold, a link is built from the first document to the second document, the similarity being a cosine function of an angle between a topic vector of the first document and the document vector of the second document; and a second device, wherein the second device comprises:
   a search engine for searching the database for a required document based on the built link wherein the link building means comprises one or more of the following units:
   a cluster page linking unit that builds the link between the cluster pages;
   a cluster-document linking unit that builds the link from the cluster page to the document;
   a document-cluster linking unit that builds the link from the document to the cluster page; and
   a document linking unit that builds the link between the documents; and wherein, when the number of documents commonly owned by a first cluster and a second cluster is greater than or equal to a threshold, the link building means builds the links between the cluster page of the first cluster and the cluster page of the second cluster; and wherein, when the proportion of the number of commonly owned documents in the first cluster is greater than that in the second cluster, the link building means generates a link from the cluster page of the second cluster to the cluster page of the first cluster, otherwise the link building means generates a link from the cluster page of the first cluster to the cluster page of the second cluster.

14. The system according to claim 13, wherein, when the similarity of a document and its cluster is greater than a threshold, the link building means generates a link from the document to the cluster page of the cluster, the similarity is a cosine function of the angle between the document vector of the document and the centroid vector of the cluster, and the centroid vector is the arithmetic average value of the document vector.

15. The system according to claim 13, wherein a link is built from a cluster page to each document therein.

* * * * *